United States Patent

[11] 3,598,157

[72] Inventors Alfred S. Farr
Granville, Ohio;
James Michael Long, Pataskala, Ohio;
Roger W. Soltis, Waynesville, N.C.
[21] Appl. No. 847,221
[22] Filed Aug. 4, 1969
[45] Patented Aug. 10, 1971
[73] Assignee Owens-Corning Fiberglas Corporation

[54] INSULATION FOR PIPE FITTING
19 Claims, 6 Drawing Figs.
[52] U.S. Cl. .................................................. 138/157,
138/109, 138/177, 138/178, 285/4, 285/47,
285/177, 285/178
[51] Int. Cl. .................................................. F16l 59/02
[50] Field of Search ........................................ 138/156,
151, 109, 157, 153, 160, 161, 149, 178; 285/177,
3, 4, 178, 303, 298, 47; 52/404, 98, 99; 126/273.5

[56] References Cited
UNITED STATES PATENTS
2,665,996 1/1954 Kalousek........................ 106/120
2,667,372 1/1954 Gardner........................ 285/177
2,717,841 9/1955 Biefeld et al.................. 117/102
2,717,848 9/1955 Jaye............................. 138/151
3,100,156 8/1963 Kalousek et al. ............. 106/120
3,147,128 9/1964 Harrell......................... 106/106 X
3,325,341 6/1967 Shannon....................... 161/168
903,316 11/1908 Reimann....................... 138/149
1,618,455 2/1927 Lindsay........................ 138/149
1,697,839 1/1929 Goerlich....................... 285/4
1,722,676 7/1929 Parker.......................... 285/177
1,774,732 9/1930 Smith.......................... 138/161
2,068,180 1/1937 Horsman....................... 138/149
2,094,444 9/1937 Bozin........................... 160/315
2,449,265 9/1948 Williams....................... 285/4
2,449,754 9/1948 Seitz........................... 285/4
2,479,504 8/1949 Moore et al. ................ 106/38.3
2,565,340 8/1951 Anderson...................... 106/99

Primary Examiner—Laverne D. Geiger
Assistant Examiner—Richard J. Sher
Attorneys—Staelin and Overman and William P. Hickey ABSTRACT: Pipe fitting insulation which can be used to insulate fittings of several different pipe sizes. Each piece of insulation has a central cavity large enough to accommodate the largest size fitting intended to be covered, and two openings communicating therewith. The openings are of progressively smaller cross section as they proceed outwardly from the central cavity.

ALFRED S. FARR,
JAMES MICHAEL LONG &
ROGER W. SOLTIS
INVENTORS

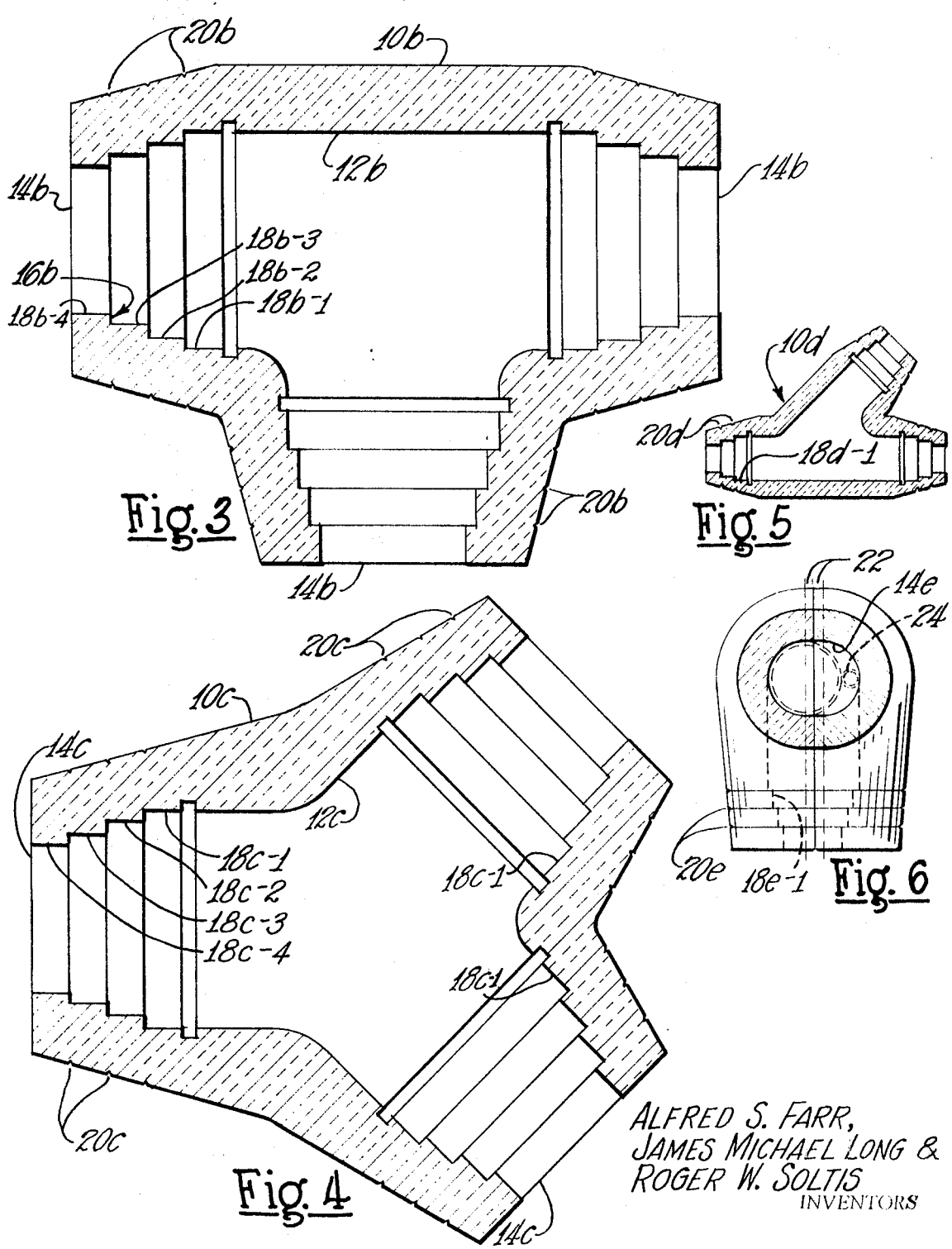

INSULATION FOR PIPE FITTING

BACKGROUND OF THE INVENTION

Pipe and tubing are made in a number of sizes, and there are a number of methods by which lengths thereof are connected together. For each standard pipe size, there are a number of different types of fittings, as for example, flanged, screwed, welded, sweated, etc., and all of these types have different outside dimensions. If pipe fitting insulation were to be made for each size and type of pipe construction, a great number of different fittings would be required. The manufacture and the warehousing of pipe fitting insulation, therefore, has been very expensive, and in most instances the trade instead of stocking the various types of pipe insulation, have covered the fittings with a slurry of asbestos and have held the same in place by an outside wrapping or covering. This forming in place of pipe fitting insulation is also expensive. A principal object of the present invention, therefore, is the provision of a preformed insulation for pipe fittings which is economical to produce and warehouse, and is further economical to install.

Further objects and advantages of the invention will become apparent to those skilled in the art to which the invention relates from the following description of applicants' preferred embodiments.

DESCRIPTION OF THE DRAWINGS

FIG. 3 is a sectional view of fitting insulation for pipe tees taken in the plane of the tee;

FIG. 4 is a sectional view of fitting insulation for Y's taken through the plane of the Y;

FIG. 5 is a sectional view taken through fitting insulation for tees with a lateral side outlet; and FIG. 6 is a sectional view of another embodiment of fitting insulation similar to that shown in FIG. 1 but specifically designed to cover steam traced piping—the view being taken in a plane along line 6–6 of FIG. 1.

DESCRIPTION OF THE PREFERRED EMBODIMENTS

Figures 1, 2:
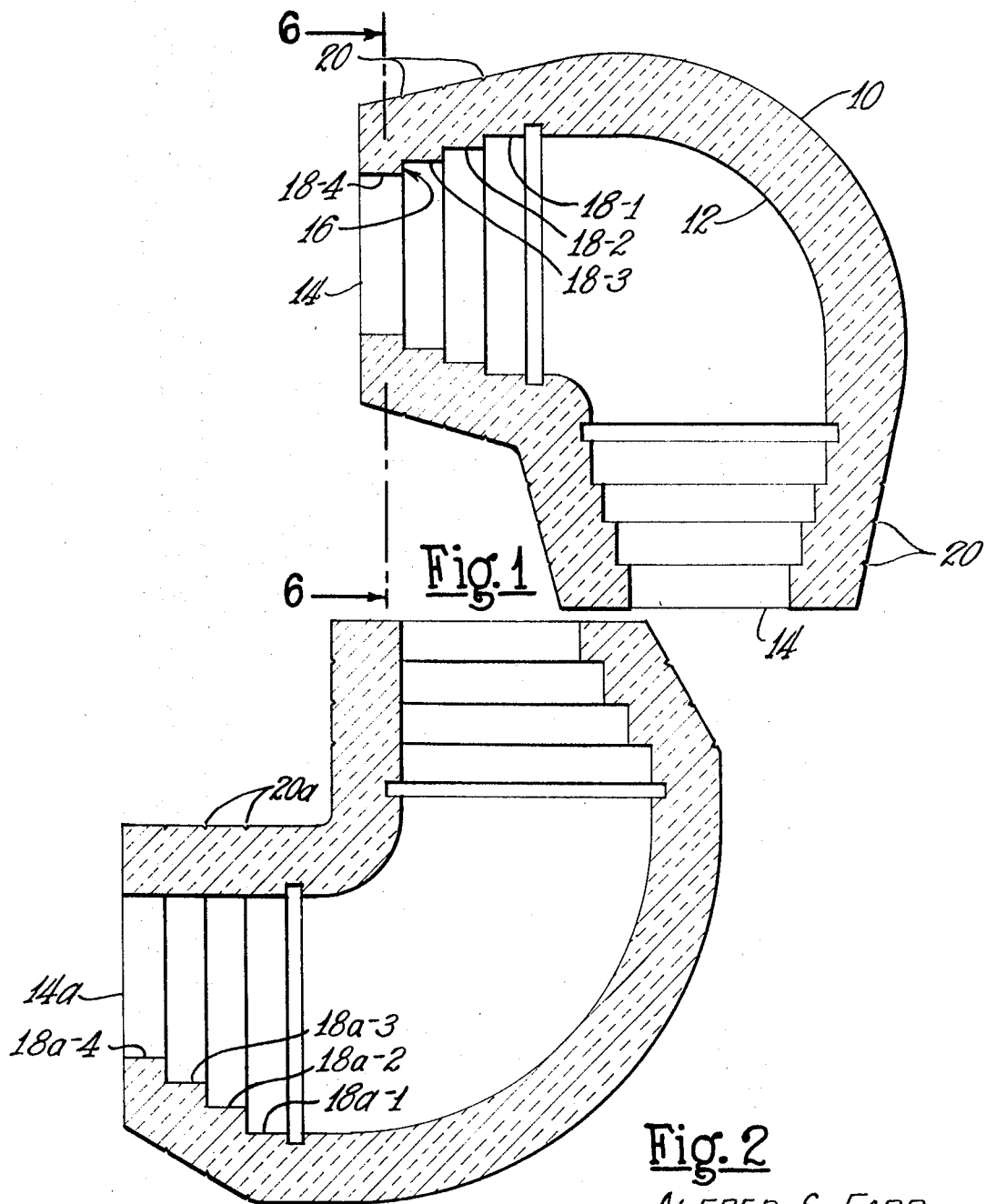
FIG. 1 is a cross sectional view of insulation for covering 90° pipe elbows.
FIG. 2 is a sectional view similar to FIG. 1, but showing another embodiment of 90° elbow insulation.

The pipe fitting insulation shown in FIG. 1 generally comprises a body 10 having a central cavity 12 having two outlet openings 14 communicating with the outside of the body 10. The openings 14 are of progressively reduced diameter as they proceed toward the outside of the body member from the central cavity 12. In some instances the surface of the opening 14 may be tapered, but in the embodiment shown in FIG. 1, the openings 14 are stepped, as at 16, to provide a plurality of concentric cylindrically shaped bearing surfaces 18–1, 18–2, 18–3, and 18–4, each of which has a diameter sized to correspond to and have a predetermined clearance with the outside diameter of a specific size pipe. The central cavity 12 is made large enough to accommodate the largest type of pipe fitting of the largest size pipe for which the fitting is to be used, and which in most instances will be a screwed pipe fitting. In the embodiment shown in FIG. 1, the cylindrical bearing surfaces 18 are concentric. The body 10 can be made of any suitable heat insulating material depending upon the service in which the insulating body is to be used. The fitting insulation shown in FIG. 1 is so formed that it can be used to insulate threaded fittings, sweat fittings, and welding fittings for 1½ inch, 2 inch, 2½ inch, and 3 inch pipe.

The insulation of FIG. 1 is made in two half sections which are a mirror image of each other. The insulation is installed by placing one half section against one side of a pipe elbow and pipes connected thereto, and placing the mirror image half section against the other side of the elbow and pipes connected thereto. The adjacent side surfaces of the sections are brought into abutment, and are held together by suitable straps, wires, or tape as the case may be. The insulation for the straight lengths of pipe connected to the elbow is butted up against the ends of the two half sections of fitting insulation, and the joint therebetween is given the same treatment as is given the joints in the insulation covering the straight runs of pipe.

When it is desired to use the fitting insulation shown in FIG. 1 for 2 inch pipe insulation, the ends of the fitting shown in FIG. 1 are cut off, as by a knife or other suitable means, inwardly of the first internal shoulder to remove the cylindrical section 18–2 for the smaller 1½ inch pipe and leave the step 18–1 whose surface is sized to engage the 2 inch pipe. This is done of course, for both openings 14, unless the elbow being insulated is a reducing elbow. There will, of course, be an air space surrounding the fitting, since the elbow is smaller than the largest elbow which the cavity 12 is designed to receive, and this added air space will not be objectionable unless the fitting insulation must support some external load. In most instances, where some external load will be applied to the fitting insulation, a mixture of asbestos and water, commonly called "mud", can be placed on top of the elbow prior to the time that the fitting sections are forced together, and this "mud" when dried, has sufficient rigidity to transfer load from the body portion 10 to the pipe fitting. While not necessary in all instances, the removal of end sections of the fittings will be facilitated if some type of indicia is provided on the outside of the fittings opposite the shoulders between the bearing surfaces 18. This is conveniently provided by circumferential indentations 20 that are molded into the external surface of the insulation body by raised surfaces of the molds in which the body is produced.

The embodiments shown in FIG. 2 corresponds generally to the fitting insulation shown in FIG. 1, excepting that the outlets 14a have stepped sidewall portions 18a which are eccentrically aligned, rather than concentrically aligned, as shown in FIG. 1. Those portions of the embodiment shown in FIG. 2 which are similar to corresponding portions of the embodiment shown in FIG. 1, are designated by a like reference numeral, characterized further in that a suffix "a" is affixed thereto. In the embodiment shown in FIG. 2, the stepped cylindrical bearing surfaces 18a are positioned so that one side edge is in alignment. The embodiment of FIG. 2 has the advantage that when installed upon pipe of any of the various sizes which it will accommodate, one side surface of the insulation will rest against one side surface of the fitting to transfer lateral forces to the pipe without cracking the insulation.

The embodiment of fitting insulation shown in FIG. 3 employs some of the same principles shown and described relative to FIG. 1, and differs principally therefrom in that it is designed to accommodate pipe tees instead of elbows. Those portions of the embodiments of FIG. 3 which are similar to corresponding portions of the embodiment of FIG. 1, are designated by a like reference numeral, characterized further in that a suffix "b" is affixed thereto. The embodiment shown in FIG. 3 will accommodate various size pipes in the same manner as does the embodiment shown in FIG. 1, and is adapted for the various size pipes by removing end portions of the tee as is necessary to provide an opening 14b with an outermost bearing surface of the appropriate diameter. The embodiment shown in FIG. 3 may also be modified as shown in the embodiment of FIG. 2 to make the stepped portions 18b aligned at one side edge.

The embodiment shown in FIG. 4 is also generally similar to the embodiment shown in FIG. 1, and differs principally therefrom in that it is designed to accommodate pipe Y's, rather than pipe elbows. Those portions of the embodiment shown in FIG. 4 which are similar to corresponding portions of the embodiment shown in FIG. 1, are designated by a like reference numeral, characterized further in that a suffix "c" is affixed thereto. The pipe fitting shown in FIG. 4 is installed in the same manner as described above for the other fittings of the invention. The embodiment shown in FIG. 4 may also be used as a covering on 45° elbows, in which case "mud" can be used to close off the third opening 14c which is not used.

The embodiment shown in FIG. 5 is generally similar to the embodiment shown in FIG. 3 excepting that the side outlet is at an angle of approximately 45° to the imaginary centerline extending through the other openings of the fitting. Those portions of the embodiment shown in FIG. 5, which are similar to corresponding portions of the embodiment shown in FIG. 3, are designated by a like reference numeral, characterized further in that a suffix "d" is affixed thereto.

The embodiment shown in FIG. 6 is generally similar to the embodiment shown in FIG. 1, excepting that the openings 14e have an oblong cross section, as do the concentric cylindrically shaped bearing surfaces 18e. The oblong shape shown is provided by straight sided leg portions 22 which extend from the semicircular section portion. The fittings are intended to be used to cover pipes having a small steam tracer line 24 affixed to one side thereof. Those portions of the embodiment shown in FIG. 6 which are similar to corresponding portions of the embodiment shown in FIG. 1 are designated by a like reference numeral, characterized further in that a suffix "e" is affixed thereto.

The insulation material that is used to form the bodies of the fitting insulation of the present invention can be of any suitable material having the necessary insulation properties and sufficient mechanical strength, so that the lengths of insulation will support their own weight during handling. For temperatures below approximately 300° F, rigid organic foams having a density of from one-half to 12 pounds per cubic foot can be used. Such foams will include polyethylene foam, polystyrene foam, polyurethane foam, phenolic foam, vinyl chloride foam, and polyester foam. In general, the organic foams will withstand water. For higher temperature applications, however, inorganic materials are necessary; and for many of these applications, inorganic foams having a 3 of from 3 to 20 pounds per cubic foot will be most suited. Such foams will include glass foams, sodium silicate foam, foamed cements such as foamed Portland cement, foamed gypsum, the foamed oxysulfate cements, as for example, magnesium oxysulfate, and the silica foams.

Fibers bonded together either by an organic resin, or an inorganic binder, and having a density of from 2 to 15 pounds per cubic foot, can also be used for the above-described temperature ranges depending upon whether an organic resin or an inorganic cement is used to bond the fibers together. Such composites will include resin bonded glass fibers, resin bonded mineral wool, resin bonded rock wool, resin bonded asbestos fibers, and resin bonded aluminum silicate or ceramic fibers.

In other instances the products may be any of the inorganic fibers given above bonded together by a small amount of organic binder to produce a porous structure that is then impregnated with an inorganic binder which becomes effective to hold the fibers together at elevated temperatures such as a clay, a silicate, a silica sol, etc. The fitting insulation can be made by: forming the glass fibers which are bonded together by the organic binder over half patterns, applying additional uncured binder, and setting the additional binder while in position against the pattern. The material so shaped can then be impregnated with the inorganic binder. See U.S. Pat. No. 2,717,841.

The fitting insulation can also be made from slurries that comprise inorganic fibers of any of the various types enumerated above mixed with calcareous and siliceous materials which are reacted with respect to each other to give a hydrous calcium silicate binder. These slurries can be poured into molds having a cavity corresponding in shape to the external surface of one-half of the insulation section, and a male portion having a surface corresponding to that of the internal cavity for the half section. After the molds are filled with the slurry, they are autoclaved to transform the slurry into its crystalline hydrous calcium silicate phase, as for example a xonotlite or a tobermorite, which bonds the fibers together. These fibers, of course, may be aluminum silicate fibers, mineral wool fibers, asbestos fibers, ceramic fibers, or glass fibers that are resistant to alkali attack. See U.S. Pat. Nos. 2,665,996 and 3,100,156.

The types of insulation material immediately above described that are produced from slurries, can also be formed into fittings by extruding the slurry around molds after the slurries have been cooked to a gelatinous stage. The extruded shapes are then heated to further set the slurry into a gelled rigid shape which can be handled and are then placed in an autoclave, and transformed into the final hydrous calcium silicate structure. See U.S. Pat. No. 2,094,444.

The fitting insulation can also be made by filter pressing a precooked slurry having particles of a calcium silicate gel around a perforated mold surface through which excess water can pass to collect the gelled solids into a shape corresponding to the desired fitting, and then autoclaving this body into its final hydrous calcium silicate phase. See U.S. Pat. No. 2,565,340.

The fitting insulation of the present invention can also be made of lightweight aggregates bonded together by an organic resin or inorganic binder. The lightweight aggregates will include expanded vermiculite, expanded perlite, glass foam pellet, clay beads, etc. The binders will include thermoset resins including aldol condensates, such as phenol formaldehyde, urea formaldehyde, melamine formaldehyde, mixtures thereof, etc. The inorganic binders may be clay, a silicate, silica sols, alumina sols, Portland cement, an oxysulfate such as magnesium oxysulfate, an oxychloride such as magnesium oxychloride, phosphate binders such as monoaluminum phosphate, or those given in U.S. Pat. No. 2,479,504. These materials will usually be reinforced with inorganic fibers. A typical such material is expanded vermiculite, mixed with glass fibers and bonded together by clay. See U.S. Pat. Nos. 3,325,341 and 3,147,128.

The oblong section shown in FIG. 6 can be easily provided on all fittings by providing straight side portions on the molds used to produce the fittings. When only oblong fittings are produced, circular section fittings can be made by trimming away the straight sidewall portions or extensions 22.

While the invention has been described in considerable detail, we do not wish to be limited to the particular embodiments shown and described, and it is our intention to cover hereby all novel adaptations, modifications and arrangements thereof which come within the practice of those skilled in the art to which the invention relates.

We claim:

1. An insulating pipe fitting covering comprising: a body of insulation material having a cavity sized to fit around a pipe fitting of predetermined size, said body having a stepped opening communicating the exterior surface of said body with said cavity, said stepped opening being of progressively smaller cross section proceeding outwardly from said cavity and being formed by cylindrically shaped step surfaces sized to snugly receive conduits of differing standard sizes, whereby an end portion of the body of insulation material can be removed at one of said steps to adapt the body for use on the diameter conduit for which said step is sized.

2. The pipe covering of claim 1 formed by two mirror image sections.

3. The pipe covering of claim 1 wherein said opening has an oblong cross section.

4. The pipe covering of claim 1 having three stepped openings with the axis of the center opening being spaced 90° from the axis of each of the other openings, and each of which stepped openings are of progressively smaller cross section proceeding outwardly from said cavity.

5. The pipe covering of claim 1 wherein said openings are a nominal 90° apart.

6. The pipe covering of claim 1 wherein said body comprises fibers bonded together by a hydrous calcium silicate binder.

7. The pipe covering of claim 1 wherein the longitudinal centerlines of the openings form an angle of approximately 135° with each other.

8. The pipe covering of claim 1 wherein said body comprises an organic foam.

9. The pipe covering of claim 1 wherein said body comprises an inorganic foam.

10. The pipe covering of claim 1 wherein said body comprises inorganic fibers bonded together by a thermoset resin.

11. The pipe covering of claim 10 wherein said body is impregnated with an inorganic binder forming material.

12. The pipe covering of claim 10 wherein said fibers are glass fibers.

13. The pipe covering of claim 10 wherein said fibers are mineral wool.

14. The pipe covering of claim 10 wherein said fibers are aluminum silicate fibers.

15. The pipe covering of claim 1 wherein said openings are eccentrically located relative to said cavity.

16. The pipe covering of claim 1 wherein the said body comprises a light weight aggregate and inorganic fibers bonded together by a binder.

17. The pipe covering of claim 1 wherein indicia are provided on the outside of the insulation generally overlying the shoulders between stepped bearing surfaces.

18 An insulating pipe fitting covering comprising: a body of insulation material having a cavity sized to fit around a pipe fitting of predetermined size, said body having two stepped openings communicating the exterior surface of said body with said cavity, said stepped openings being of progressively smaller cross section proceeding outwardly from said cavity and being formed by cylindrically shaped step surfaces sized to snugly receive conduits of differing standard sizes, whereby an end portion of the body of insulation material surrounding one opening can be removed at one size step to accommodate one size pipe, and another end portion of the body of insulation material surrounding the other opening can be removed at a corresponding or a differing size step to accommodate the same or a different size pipe to adapt the body for use on standard or reducing pipe fittings.

19 An insulating pipe fitting cover comprising: a pair of insulation sections each having a mating surface for abutment with the other section and side surfaces generally normal thereto, each of said mating surfaces having a fitting receiving recess having two pipe receiving side outlets communicating with spaced side surfaces of the section and with the side outlets of at least one of said sections having cylindrically shaped step surfaces sized to snugly receive conduits of differing standard sizes and with the stepped surfaces being arranged in a manner becoming progressively more shallow proceeding in the direction of the side surface to which the recess communicates, and whereby corresponding portions of each section can be removed at one of said steps to adapt the sections for use as a fitting covering for conduits of a size corresponding to the size of the step at which the insulation material was removed.